United States Patent [19]

Fritts

[11] 4,395,469
[45] Jul. 26, 1983

[54] LOW PRESSURE NICKEL HYDROGEN BATTERY

[75] Inventor: David H. Fritts, Dayton, Ohio

[73] Assignee: The United States of America as represented by the Secretary of the Air Force, Washington, D.C.

[21] Appl. No.: 283,245

[22] Filed: Jul. 14, 1981

[51] Int. Cl.³ .............. H01M 2/00; H01M 2/04; H01M 4/36; H01M 8/18

[52] U.S. Cl. ........................... 429/34; 429/21; 429/101

[58] Field of Search .......... 429/34, 27, 29, 12, 429/17, 40, 46, 223, 22, 25, 21, 38, 101

[56] References Cited

U.S. PATENT DOCUMENTS

| | | | |
|---|---|---|---|
| 3,544,375 | 12/1970 | Ruben | 136/86 |
| 3,565,691 | 2/1971 | Strier et al. | 429/34 |
| 3,669,744 | 6/1972 | Tsenter et al. | 136/28 |
| 3,867,199 | 2/1975 | Dunlop et al. | 429/101 |
| 3,990,910 | 11/1976 | Giner et al. | 429/223 |
| 4,080,487 | 3/1978 | Reiser | 429/16 |
| 4,127,703 | 11/1978 | Holleck | 429/57 |
| 4,129,683 | 12/1978 | Maricle | 429/21 |

Primary Examiner—Donald L. Walton
Assistant Examiner—Stephen J. Kalafut
Attorney, Agent, or Firm—Donald J. Singer; Bernard E. Franz

[57] ABSTRACT

The battery system has the hydrogen gas stored at high pressure separately from the nickel-hydrogen cells. Two valves, a pressure regulator, and a pump permit hydrogen to be supplied to the cells at a relatively low pressure for discharge, and to be recovered and stored at high pressure during charge. Both valves are closed during standby to limit self discharge.

3 Claims, 3 Drawing Figures

LOW PRESSURE NICKEL HYDROGEN BATTERY

RIGHTS OF THE GOVERNMENT

The invention described herein may be manufactured and used by or for the Government of the United States for all governmental purposes without the payment of any royalty.

BACKGROUND OF THE INVENTION

This invention relates to a rechargeable storage cell of the type which employs a gas as one member and a chemically active solid state material as the other member of the electrochemical couple, and more particularly to a low pressure nickel hydrogen battery system.

Considerable attention has been devoted in recent years to development of electric vehicles. One deterrent is the high weight-to-energy storage ratio of the lead-acid battery. Among other things, this severely limits the cruising range between charges for such vehicles.

Substantial attention has been devoted to the development of electric power secondary cells which employ a gas as one member and a chemically active solid state material as the other member of the electrochemical couple. One such type is a cell in which the anode is a chemically oxidizable metal and the depolarizer is oxygen, e.g. zinc/air and cadmium/air batteries. A second type utilizes an electrochemically reducible metal oxide, e.g. nickel oxide, at the cathode and a gas that is oxidizable and ionizable, e.g. hydrogen, at the anode. A cell of the latter type is disclosed in U.S. Pat. No. 3,544,375 to S. Ruben for Rechargeable Fuel Cell, which requires feeding hydrogen gas into the cell when it is being discharged, venting hydrogen gas when the cell is being recharged and submerging the cathode and anode in the electrolyte. The hydrogen is claimed to be supplied under pressure, but the magnitude is not mentioned.

Dunlop et al. in U.S. Pat. No. 3,867,199 teaches as disadvantages to be avoided the requirements set forth by Ruben of feeding and venting hydrogen gas and of submerging the electrodes in the electrolyte, and instead proposes a high-pressure, hermetically sealed cell to prevent inflow and outflow of gas during charging and discharging. See also Tsenter et al. U.S. Pat. No. 3,669,744 and Holleck U.S. Pat. No. 4,127,703 for high pressure hermetically sealed cells. The charge and discharge conditions, cell constructions and operating data are described in an article by Giner and Dunlop, "The Sealed Nickel-Hydrogen Secondary Cells", Journal of the Electrochemical Society, Volume 122, number 1, pages 1-11 (January 1975). That article and the above mentioned U.S. patents are incorporated herein by reference.

The current state of the art relating to nickel hydrogen batteries is definitely that of high-pressure hermetically sealed cells. There are several problems associated with such cells. These include (1) expensive cell fabrication, (2) high self-discharge rates and (3) poor heat transfer characteristics. The application of nickel-hydrogen battery technology has therefore been limited to applications such as used in satellites. I am not aware of any current teaching or use of a cell as disclosed by Ruben, or any other low pressure nickel-hydrogen cell.

SUMMARY OF THE INVENTION

An object of the invention is to provide a long life, low weight, relatively inexpensive, and superior secondary cell.

The principal feature of the invention is the use of remote hydrogen storage rather than hydrogen storage in each cell. This allows low pressure cells and virtual elimination of cell self-discharge.

Further, according to the invention, cells are operated in a starved electrolyte (non-flooded) condition to prevent flooding of the negative electrode.

Head space in cells is kept to a minimum to limit the amount of hydrogen available for self-discharge and to improve the energy density.

DETAILED DESCRIPTION

Figure 2:
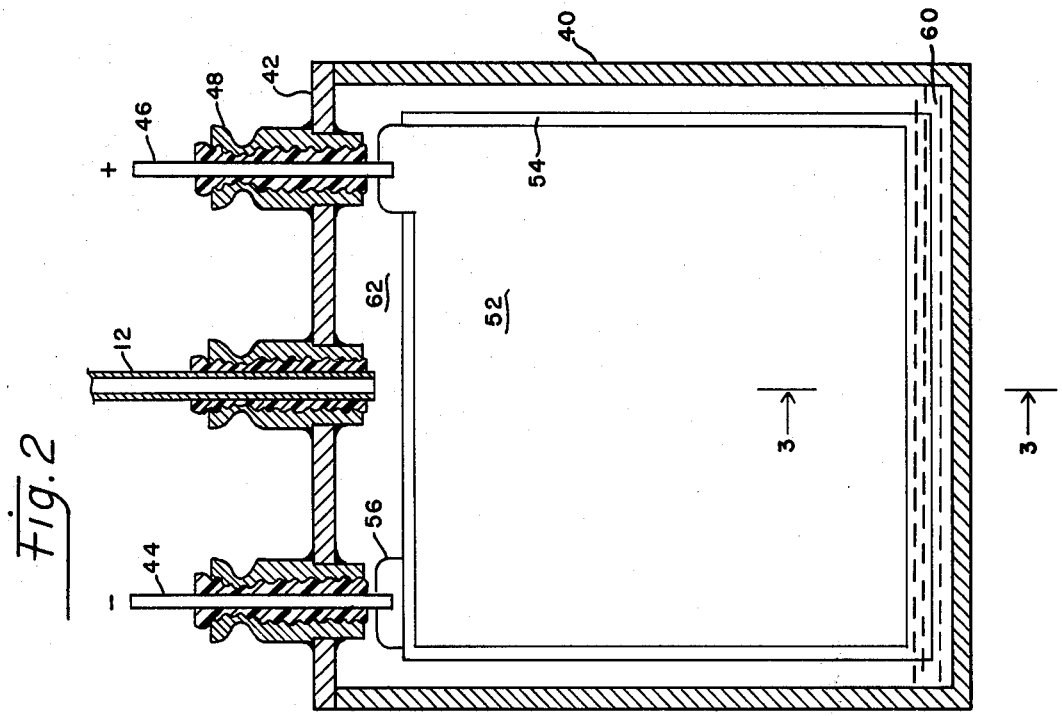
FIG. 2 is a symbolic vertical cross section view of one nickel-hydrogen cell.
Figure 1:
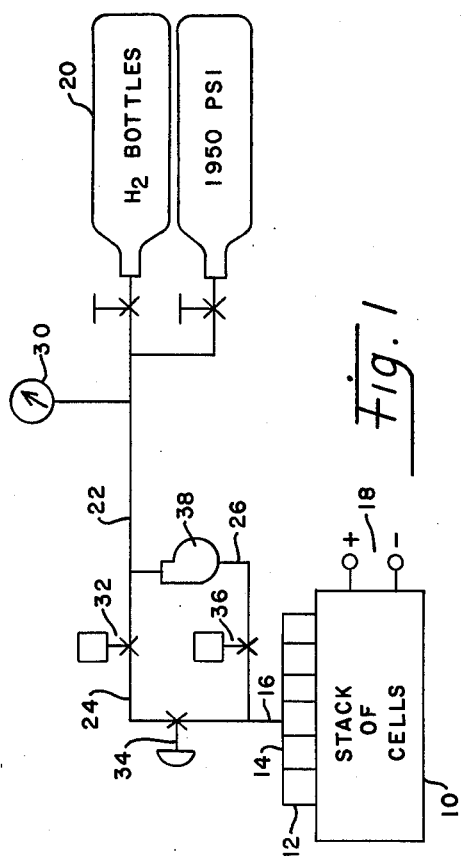
FIG. 1 is a symbolic diagram of a nickel hydrogen battery system according to the invention.
Figure 3:
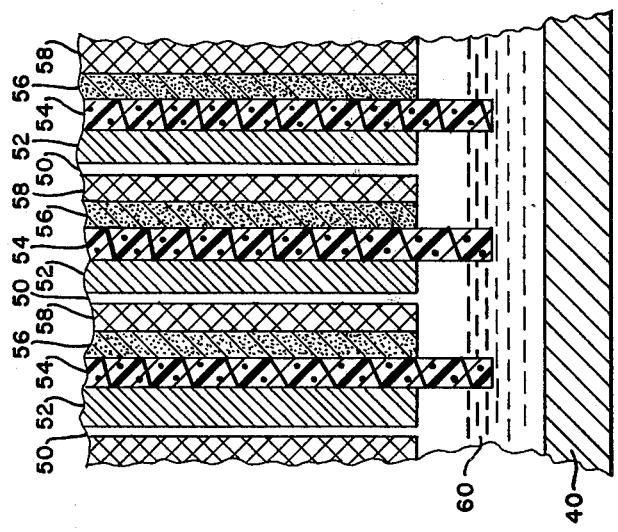
FIG. 3 is a partial enlarged cross section view taken along lines 3—3 of FIG. 2.

The specific embodiment of a 20 kilowatt-hour battery system is described with reference to the symbolic diagram of FIG. 1. The stack 10 comprises several nickel-hydrogen cells, such as shown in FIGS. 2 and 3. Each cell has an individual gas line 12 extending into the interior thereof. A manifold 14 connects all of these individual gas lines to a common low pressure line 16. The stack 10 also has positive and negative electric terminals 18.

The hydrogen is stored in gas bottles 20 at a pressure of up to 1950 psi (pounds per square inch). The gas lines from the bottles are connected to a common high pressure line 22. The low pressure line 16 and high pressure line 22 are connected via parallel discharge path 24 and charging path 26. A pressure gage 30 connected via a branch to line 22 indicates the bottle pressure, which is a measure of the state of charge of the battery system, and thus is equivalent to a fuel gage.

The discharge path 24 includes a valve 32 and a pressure regulator 34. The charging path 26 includes a valve 36 and a pump 38.

During discharge, valve 32 is open and valve 36 is closed. An electric load (e.g. vehicle motor not shown) is connected to the terminals 18. The regulator receives the hydrogen gas at high pressure, and delivers it at a fixed low pressure for use in the cells of stack 10. This low pressure may be at a gage pressure as low as five psi, and up to about 100 psi. A pressure of 65 psi would be satisfactory.

During charge, valve 32 is closed and valve 36 is open. An electric charger circuit (not shown) is connected to terminals 18. The electric supply is also connected to operate the motor of pump 38. The pump operates only during charge, to pump the hydrogen evolved by the cell stack 10, and deliver it at high pressure for storage.

During standby in a charged state, both valves 32 and 36 are closed, which prevents significant self-discharge. A pump 38 for 3.1 cubic inches, requires 450 revolutions per minute for a four hour recharge. A suitable pump is listed in the 1980 McMaster-Carr catalog.

A typical cell which may be used in cell stack 10 is shown symbolically in FIGS. 2 and 3. The cell assembly techniques are well known in the art from standard nickel-cadmium aircraft type cells and from nickel-hydrogen cell technology. The cell cases and electrode tabs essentially are nickel-cadmium common practice. The remainder of the cell (except possibly seals) is nickel-hydrogen technology.

Nickel-cadmium battery technology is now well developed. For example, it was one of the principal topics covered by the 1970 NASA/GSFC Battery Workshop held at the Goddard Space Flight center during November 1970. The transcript of Proceedings was published by Ace-Federal Reporters, Inc., 415 Second St., N.E. Washington, D.C., 20002. Seals were discussed in session 3, reported on pages 312–350. The cell case 40 and cap 42 shown herein in FIG. 2 may be either a suitable plastic, or a metal such as stainless steel or nickel. It may be of low pressure construction such as is used for nickel-cadmium aircraft batteries. The cap 42 is secured to the case 40 by suitable fasteners and a gasket or other seal, not shown. The electrodes 44, 46 and the gas line 12 are sealed into the cap 42. For example, three Zieglar crimp type seals 48 (page 336A of said Workshop Proceedings) may be used. These seals have proven themselves to be impervious to hydrogen leakage. These seals can be manufactured at reasonable cost if they are precast and the external metal components are cast into the cell case top. The entire case assembly can be made at a very low cost, compared to the high pressure tank construction used for present nickel-hydrogen cells.

The selection of materials for the internal components of the cell may be from current nickel-hydrogen battery technology. The Dunlop et al., Tsenter and Holleck patents and the Giner and Dunlop article referenced under "Background" are representative of this art. Reference may also be made to the reports on the Goddard Space Flight Center Battery Workshops held annually.

The cross section view of FIG. 2 shows a positive electrode 52 in front, followed by a separator 54, and then a negative electrode 56 behind which only a tab connected to terminal 44 shows. Instead of the bus bars generally used in current nickel-hydrogen cells, the electrodes may have tabs connected to the terminals 44 and 46, as in nickel-cadmium cells. The vertical orientation of the electrodes makes this convenient.

Note that the cell is operated in a starved electrolyte (non-flooded) condition to prevent flooding of the negative electrodes. This means that there is a small amount of electrolyte 60 which is absorbed in the separators 54 by wick action.

Head space 62 in the cell is kept to a minimum (e.g. one half inch) to limit the amount of hydrogen available for self-discharge and to improve energy density. This means that when valves 32 and 36 are closed and the terminals 18 (FIG. 1) are disconnected for standby, there is a minimum residue of hydrogen gas left in the cells.

More detail of one possible electrode configuration structure is shown in an enlarged section view across the plates near the bottom of the cell, taken along lines 3—3 of FIG. 2. Adjacent each negative electrode 56 there is a gas space 58. This may comprise a plastic mesh which provides a gas space allowing easy diffusion of hydrogen to the negative electrodes. Each negative electrode 56 may be made of Teflon-bonded platinum powders on a nickel support screen to provide good conductivity. The positive electrodes 52 may be a sintered nickel structure, impregnated with the electroactive material (NiOOH). A carbon substrate is lighter and cheaper, but has a lower power capability. The separators 54 may be of asbestos, Zincar, nylon, or other suitable material. There is also a porous membrane 50 on the other side of each positive electrode. Not shown in FIG. 3 is an optical polypropylene matrix as a reservoir, which in some cases is located between the positive electrode 52 and the porous membrane 50. Another common option is to arrange the electrodes back-to-back. The electrolyte 60 is aqueous KOH.

The energy densities of the 20 kilowatt-hour system are estimated as follows. Assume the cells operate at 1.25 volts. The theoretical and practical ampere-hours per gram for hydrogen is 20.4, so that 784 grams is needed (20,000 divided by the product of 1.25 and 20.4). A standard A size gas bottle holds 430 grams of hydrogen at a pressure of 1950 psi. Two bottles 20 (FIG. 1) provide 860 grams, which gives a margin for head space, lines, and hydrogen diffusion losses. Each bottle takes up to 55 liters of volume and weighs 62 kilograms. The storage requirements for the hydrogen thus require a volume of 110 liters and a weight of 124 kilograms. The estimation for the nickel-hydrogen cell energy densities is based on published technology for such cells. The ratio of weights of the internal cell components is positive electrodes 0.633, negative electrodes 0.103, separators 0.057, screens 0.014, and electrolyte 0.193 to total 1.000. The energy density for the above components is 80.5 watt-hours per kilogram and 0.122 ampere-hours per cubic centimeter. For a 2500 watt-hour cell, the cell stock will weigh 31.1 kilograms and have a volume of 16.4 liters. To estimate total battery weight and volume (less hydrogen tanks), packing factors of 20% were used for volume and 15% for weight. Gas lines were ignored as they can be located on an electric vehicle with negligible penalty. The resulting complete battery system weight and volume is 410 kilograms and 267 liters. The energy densities are 49 watt-hours per kilogram and 75 watt-hours per liter. If an electric vehicle is designed such that the hydrogen is stored in the vehicle structural members, then the energy densities are 70 watt-hours per kilogram and 127 watt-hours per liter.

Another hydrogen storage technique being investigated for electric vehicles using fuel cell is hydrides which absorb the hydrogen. This technique requires heat to drive the hydrogen out for use.

The motor for pump 38 may be designed in such a way that it need not be carried on the vehicle. It can be a part of the charging system, and coupled to the motor during charge by a technique such as a magnetic clutch. The clutch also has the advantage of keeping the hydrogen system completely sealed.

CONCLUSION

The invention is a unique combination of components that allows nickel hydrogen batteries to be operated at pressures below 100 psi. In addition, this combination makes the self-discharge rate of the batteries controllable. The reduced operating pressure allows the use of conventional battery cases thus eliminating the large cost factor associated with these batteries. This, in conjunction with controlled self-discharge, inherent state of charge indicator, excellent cold temperature performance, inherent high cycle life and good energy density make a low pressure nickel hydrogen battery attractive for electric vehicles.

Thus, while preferred constructional features of the invention are embodied in the structure illustrated herein, it is to be understood that changes and variations may be made by the skilled in the art without departing from the spirit and scope of my invention.

I claim:

1. A nickel-hydrogen battery system comprising:

at least one nickel-hydrogen cell which includes a plurality of positive and negative electrodes with separators in a starved electrolyte condition enclosed in a low pressure casing, with positive and negative terminals and a cell gas line sealed into said casing;

storage means for storing only hydrogen outside of said cell;

gas lines comprising parallel discharge and charge paths between said cell gas line and said storage means, with the discharge path comprising a first valve means with a pressure regulator, and the charge path comprising a second valve means in series with a pump;

the first valve means being open and the second valve means being closed during discharge, so that hydrogen is supplied via the regulator at a controlled low pressure to said cell;

the first valve means being closed and the second valve means being open during charge, and power being applied to the pump, so that hydrogen evolved by said cell is supplied to the storage means;

so that said cell is at a relatively low pressure at all times during discharge, charge, and standby.

2. The battery system according to claim 1, wherein the hydrogen in said storage means is at a relatively high pressure for a fully charged condition;

and wherein the system includes means for minimizing self discharge of said cell during standby, comprising said cell having a minimum of head space between a cap of the casing and the electrode assembly, and providing that said first and second valve means may both be closed during standby.

3. The battery system according to claim 1 or 2, wherein the system comprises a plurality of said cells, and the gas lines include a manifold connected in parallel to the cell gas lines of all of the cells.

* * * * *